US010628104B2

(12) United States Patent
Iwamoto

(10) Patent No.: US 10,628,104 B2
(45) Date of Patent: Apr. 21, 2020

(54) ELECTRONIC DEVICE, WEARABLE DEVICE, AND DISPLAY CONTROL METHOD

(71) Applicant: Toshiba Client Solutions CO., LTD., Koto-ku, Tokyo (JP)

(72) Inventor: Rinzo Iwamoto, Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 175 days.

(21) Appl. No.: 15/977,937

(22) Filed: May 11, 2018

(65) Prior Publication Data

US 2019/0196769 A1    Jun. 27, 2019

(30) Foreign Application Priority Data

Dec. 27, 2017    (JP) ................. 2017-250968

(51) Int. Cl.
*G06F 3/14* (2006.01)
*G02B 27/01* (2006.01)
*G06F 1/16* (2006.01)
*H04B 1/3827* (2015.01)

(52) U.S. Cl.
CPC ........... *G06F 3/14* (2013.01); *G02B 27/0176* (2013.01); *G02B 27/0179* (2013.01); *G06F 1/163* (2013.01); *H04B 1/385* (2013.01); *G02B 2027/0178* (2013.01); *G02B 2027/0187* (2013.01); *H04B 2001/3866* (2013.01)

(58) Field of Classification Search
CPC .... G02B 2027/0178; G02B 2027/0187; G02B 27/0176; G02B 27/0179; G06F 1/163; G06F 3/14; H04B 1/385; H04B 2001/3866
See application file for complete search history.

(56) References Cited

U.S. PATENT DOCUMENTS

| 4,869,575 | A  | * | 9/1989  | Kubik ...................... G02C 7/14 345/8 |
| 6,292,158 | B1 | * | 9/2001  | Amafuji ............... G02B 27/017 345/7 |
| 7,631,968 | B1 | * | 12/2009 | Dobson ................... H04M 1/05 345/8 |
| 8,123,352 | B2 | * | 2/2012  | Matsumoto ........ G02B 27/0176 351/114 |
| 8,493,287 | B2 | * | 7/2013  | Yamamoto ......... G02B 27/0176 345/8 |
| 2008/0169998 | A1 | * | 7/2008 | Jacobsen ............ G02B 27/0172 345/8 |

(Continued)

FOREIGN PATENT DOCUMENTS

JP    2010-113503 A    5/2010
JP    2012-093897 A    5/2012

*Primary Examiner* — Dmitriy Bolotin
(74) *Attorney, Agent, or Firm* — Knobbe, Martens, Olson & Bear, LLP

(57) ABSTRACT

According to one embodiment, an electronic device is connectable to a wearable device including a display device, an attachment sensor, and a posture sensor. The electronic device includes a screen direction controller configured to control a direction of a screen of the display device according to a posture of the wearable device detected by the posture sensor for a period of time beginning at a time when the attachment sensor has detected that a user has put on the wearable device.

20 Claims, 10 Drawing Sheets

(56) References Cited

U.S. PATENT DOCUMENTS

| | | | |
|---|---|---|---|
| 2008/0291277 A1* | 11/2008 | Jacobsen | G02B 27/0172 348/158 |
| 2010/0245757 A1* | 9/2010 | Sugihara | G02B 27/0172 351/158 |
| 2012/0249741 A1* | 10/2012 | Maciocci | G06F 3/011 348/46 |
| 2014/0168784 A1* | 6/2014 | Hiraki | G02B 27/0176 359/630 |
| 2015/0009103 A1* | 1/2015 | Ito | G06F 3/01 345/8 |
| 2015/0145887 A1* | 5/2015 | Forutanpour | G06F 3/017 345/633 |
| 2015/0363974 A1* | 12/2015 | Nakai | G06K 9/00671 345/419 |
| 2016/0282619 A1* | 9/2016 | Oto | G02B 27/017 |
| 2016/0334623 A1* | 11/2016 | Kishi | G08G 1/0962 |
| 2016/0334911 A1* | 11/2016 | Kimura | G06F 3/0412 |
| 2017/0090557 A1* | 3/2017 | Raffle | G06F 3/013 |
| 2017/0116479 A1* | 4/2017 | Ouchi | G06F 3/04886 |
| 2017/0227779 A1* | 8/2017 | Kato | G02B 27/02 |
| 2018/0173017 A1* | 6/2018 | Imagawa | G02C 11/10 |
| 2018/0181196 A1* | 6/2018 | Lee | H04N 5/23296 |
| 2018/0249086 A1* | 8/2018 | Ozawa | G06F 3/00 |
| 2019/0179409 A1* | 6/2019 | Jones | G06F 3/013 |
| 2019/0369402 A1* | 12/2019 | Woodman | G06F 3/167 |

\* cited by examiner

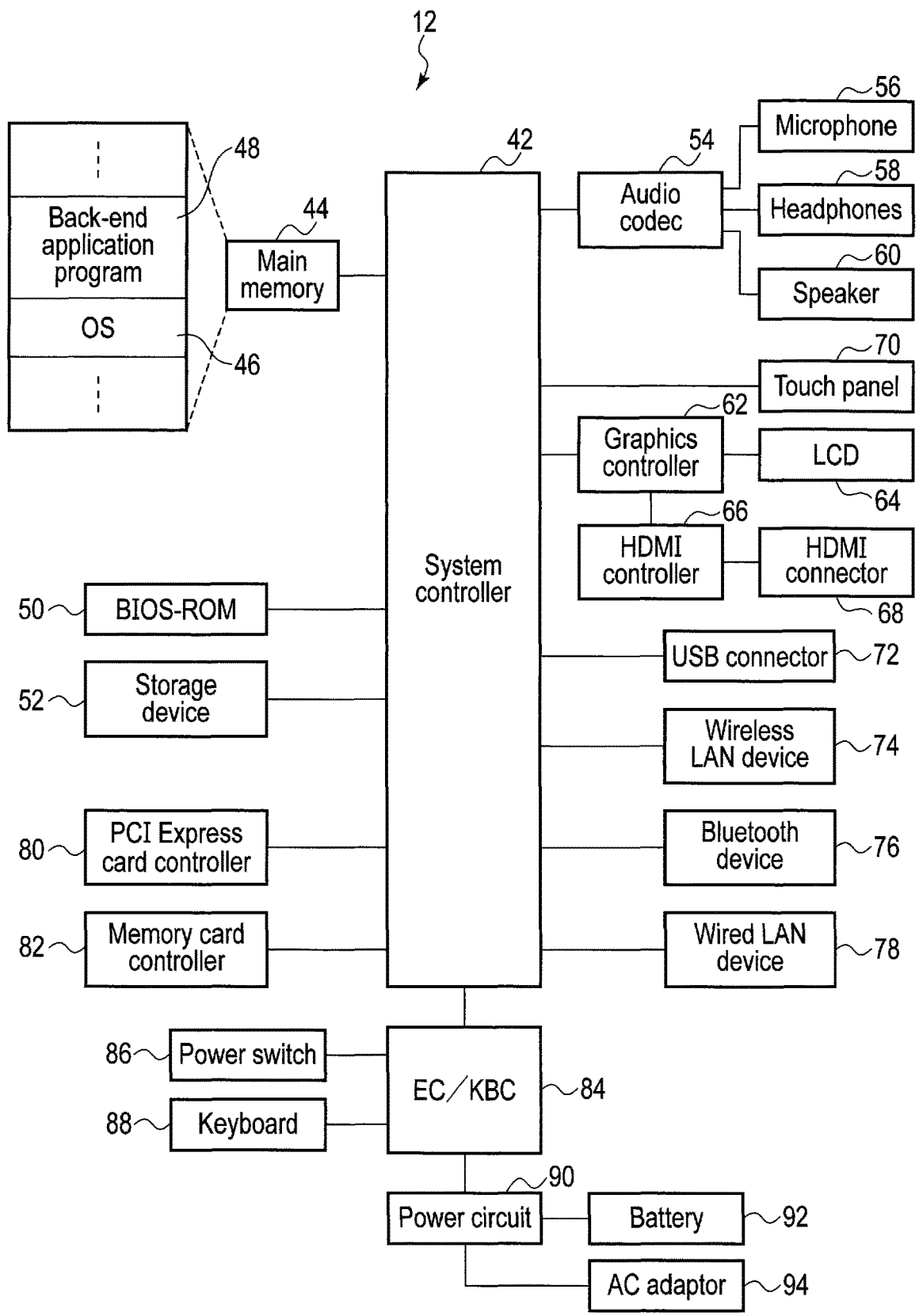
F I G. 2

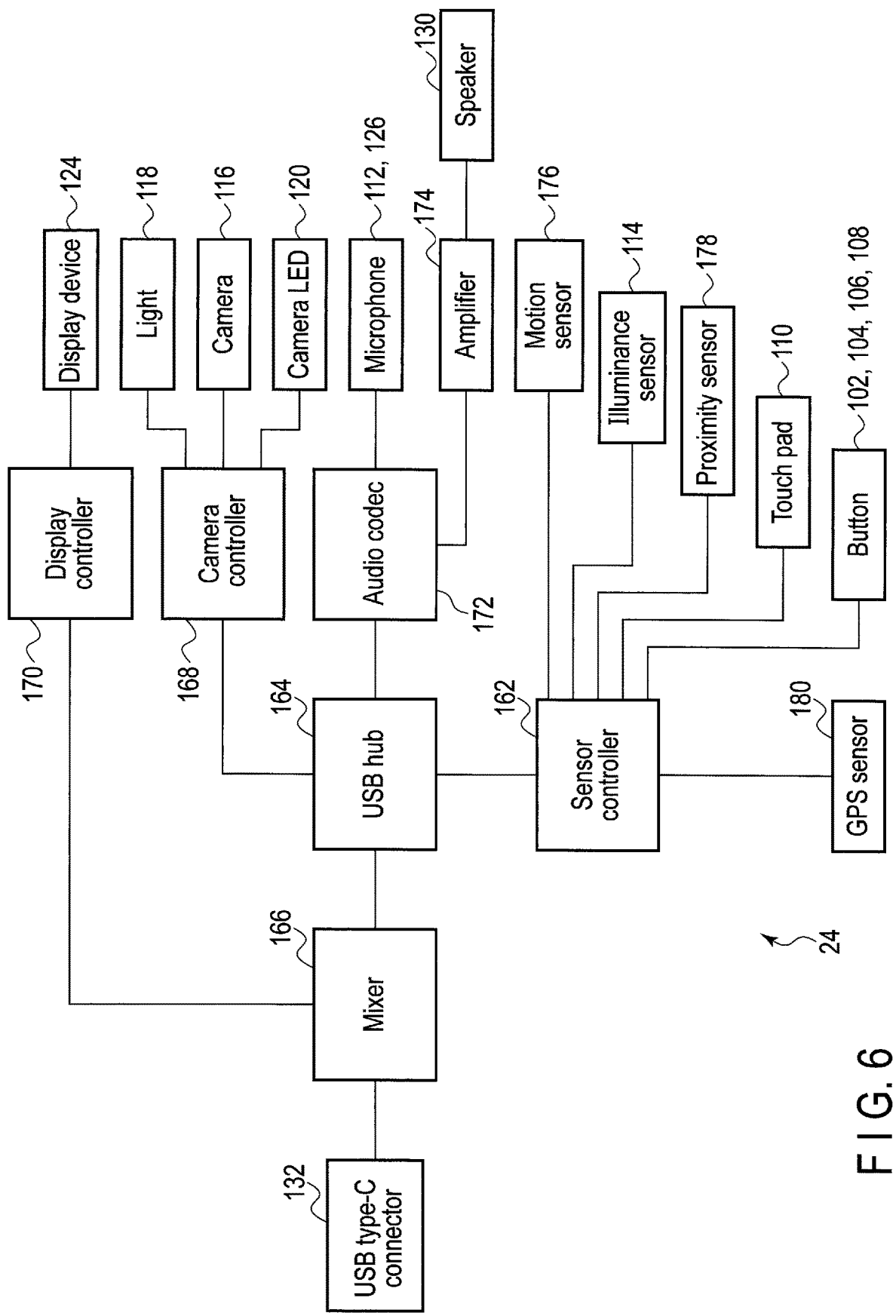
F I G. 6

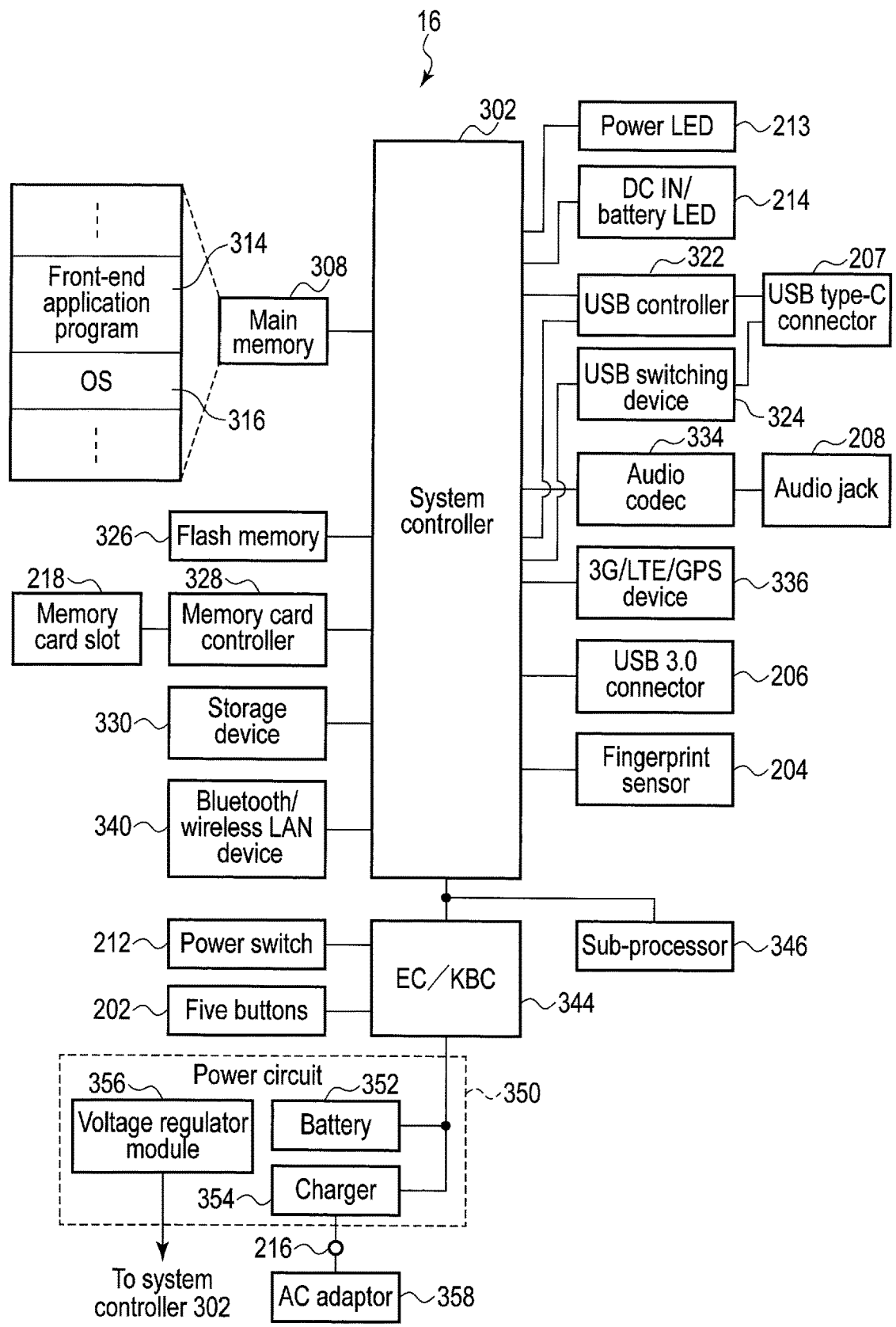
F I G. 8

ELECTRONIC DEVICE, WEARABLE DEVICE, AND DISPLAY CONTROL METHOD

CROSS-REFERENCE TO RELATED APPLICATIONS

This application is based upon and claims the benefit of priority from Japanese Patent Application No. 2017-250968, filed Dec. 27, 2017, the entire contents of which are incorporated herein by reference.

FIELD

Embodiments described herein relate generally to an electronic device, a wearable device, and a display control method.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and high processing capacity, and able to be used by a worker (user) on site, is needed separately from a data center (or cloud). Thereby, it is expected that promotion of the operational efficiency and productivity improvement at a workplace and the like, or load dispersion of data and improvement of a network environment will be achieved.

Further, in the conventional mobile devices such as a portable telephone, a smartphone, a portable game device, and the like, the direction of a screen (vertical direction of contents on the screen) is controlled according to the manner of holding the mobile device by the user. The direction of the screen depends on how the user holds the device, and the direction of the screen is not to be set in advance. For this reason, a motion sensor configured to detect a posture of a device is incorporated into the device, and the direction of the screen is controlled according to the detection result of the motion sensor.

In the direction control of the screen of the conventional mobile device, the motion sensor reacts to a very small change in posture of the mobile device depending on the setting of the motion sensor, and the direction of the screen is frequently changed unintentionally.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary structure of an operator terminal 12 in FIG. 1.

FIG. 6 is a block diagram showing an exemplary structure of the wearable device main body 24.

FIG. 8 is a block diagram showing an exemplary structure of the mobile PC 16.

DETAILED DESCRIPTION

Figure 1:
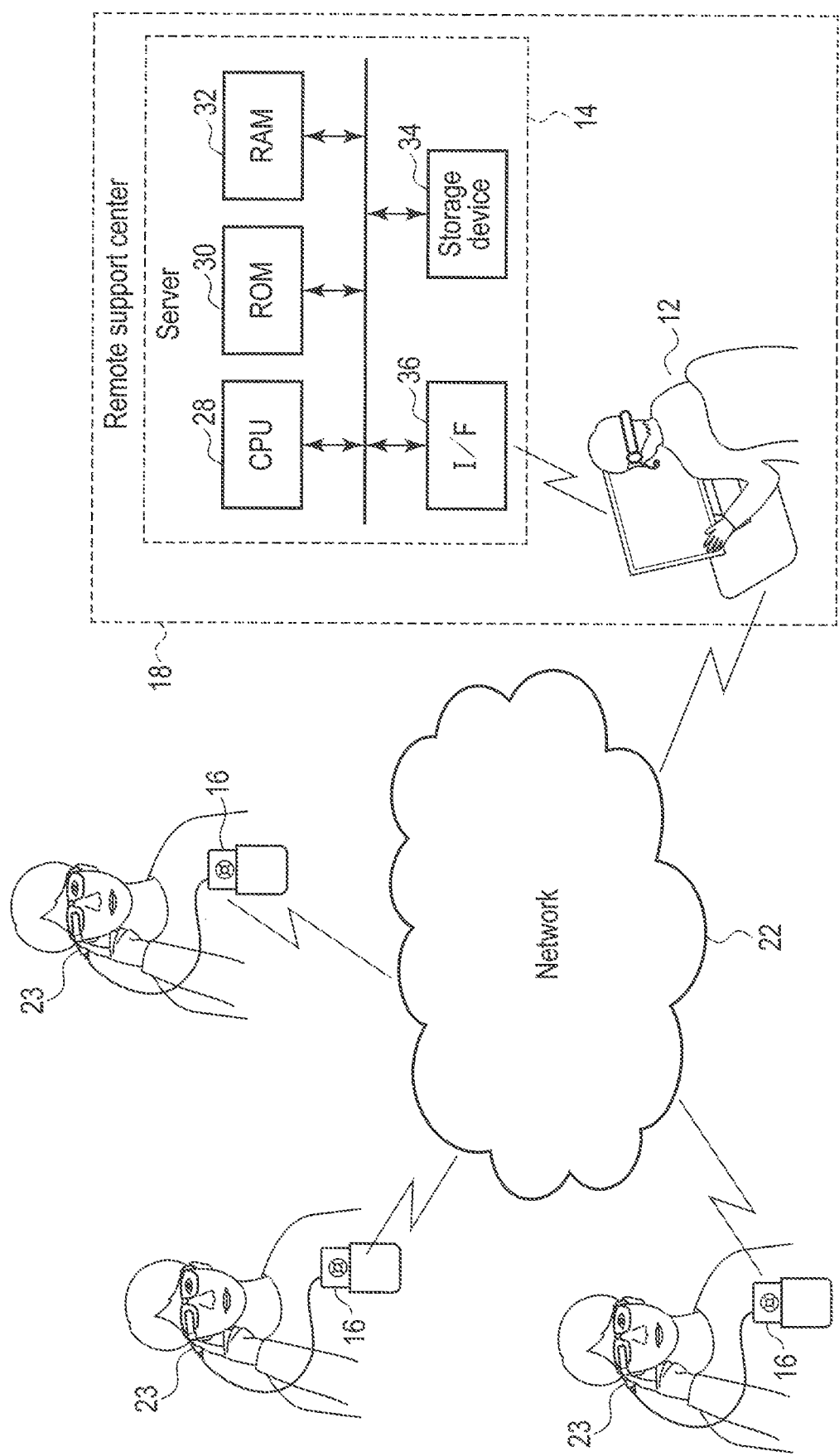
FIG. 1 is a block diagram showing an example of a remote support system including an electronic device of an embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device is connectable to a wearable device including a display device, an attachment sensor, and a posture sensor. The electronic device includes a screen direction controller configured to control a direction of a screen of the display device according to a posture of the wearable device detected by the posture sensor for a period of time beginning at a time when the attachment sensor has detected that a user has put on the wearable device.

[Remote Support System]

FIG. 1 is a block diagram showing an example of a remote support system configured to realize edge computing. The remote support system is configured to be used by an operator at the rear to support a user, for example, a worker at a workplace from a remote place. Examples of work at the workplace include a complicated maintenance service, picking operation in a distribution warehouse, monitoring of a workplace, disaster relief/medical support, and the like. The worker side of the workplace is also called a front end, and the operator side at the rear is also called a back end. In the remote support system, a mobile personal computer (PC) (also called a mobile edge computing device in some cases) 16 carried by the worker and remote support center (data center) 18 located at a position distant from the worker are connected to each other through a network 22, such as the Internet, so that communication can be carried out between them. The mobile PC 16 and remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a camera and display device. An image shot by the camera may be transmitted to the mobile PC 16, and the image transmitted from the mobile PC 16 may be displayed on the display device.

As shown in FIG. 1, it is also possible for a plurality of workers to communicate with each other through the network. In this case, communication may also be carried out through the remote support center 18, and communication can also be carried out only between the workers without being carried out through the operator of the remote support center 18.

The remote support center 18 is provided with an operator terminal 12 and a server 14. The remote support center 18 makes a voice call or information exchange between the mobile PC 16 (and wearable device 23) and the operator terminal 12. It is possible to carry out video distribution of a real-time image shot by the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the wearable device 23, whereby hands-free picking can be realized.

The remote support typically includes, for example, the following functions:

(1) A voice call function of carrying out an interactive voice call between the mobile PC 16 and the operator terminal 12.

(2) A live image distribution function of carrying out video distribution of a real-time image shot by the wearable device 23 to the operator terminal 12 during a voice call.

(3) A function of carrying out transmission/reception of a still image between the mobile PC 16 and the operator terminal 12 during a voice call (The mobile PC 16 transmits a shot still image or a capture image being video-distributed to the operator terminal 12. The operator terminal 12 edits the received image by writing characters or pictures, and transmits the edited image to the mobile PC 16. The still image received by the mobile PC 16 is stored in a folder in the mobile PC 16, and can be browsed).

(4) A screen sharing function of displaying the entire desk-top screen of the operator terminal 12 or a window of an arbitrary application program on the wearable device 23 during a voice call.

(5) A text message transmitting function of transmitting a text message from the operator terminal 12 to the mobile PC 16.

The server 14 is configured to carry out processing for remote support in place of or in cooperation with the operator terminal 12, and is provided with a processor (CPU) 28, ROM 30, RAM 32, and a storage device 34 constituted of a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 is constituted of a desktop PC, notebook PC or the like.

The operator issues an instruction to the worker having the mobile PC 16 by a conversation or image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file into the operator terminal 12.

The operator terminal 12 is provided with a system controller 42 including a processor. A main memory 44, a BIOS-ROM 50, a storage device 52 constituted of HDD or SSD, an audio codec 54, a graphics controller 62, a touch panel 70, a USB (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage device 52 into the main memory 44. These programs include an operating system (OS) 46, and back-end application program 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and headphones 58 may be provided singly, and may also be provided in an integrated manner as an intercom.

The graphics controller 62 controls a liquid crystal display (LCD) 64 to be used as a display monitor of the operator terminal 12. The touch panel 70 is overlaid on the screen of the LCD 64, and is configured in such a manner as to allow a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to an external display device.

The wireless LAN device 74 executes wireless LAN communication of the IEEE802.11 standard for the purpose of connection to the network 22. The Bluetooth device 76 executes wireless communication of the Bluetooth standard for the purpose of connection to an external device. The wired-LAN device 78 executes wired LAN communication of the IEEE802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal 12 and an external device. The memory card controller 82 writes data into a storage medium, for example, a memory card such as an SD (Secure Digital) card (registered trade mark), and reads data from the memory card.

The EC/KBC 84 is a power management controller, and is realized as a one-chip microcomputer incorporating therein also a keyboard controller configured to control a keyboard 88. The EC/KBC 84 has a function of powering on or powering off the operator terminal 12 according to an operation of a power switch 86. Control of the power-on and power-off is executed by cooperation between the EC/KBC 84 and a power circuit 90. Even while the operator terminal 12 is in the power-off state, the EC/KBC 84 operates by power from a battery 92 or an AC adaptor 94. The power circuit 90 uses the power from the battery 92 or from the AC adaptor 94 (to be connected as an external electric power supply) to generate the power to be supplied to each component.

[Wearable Device 23]

Figure 3:
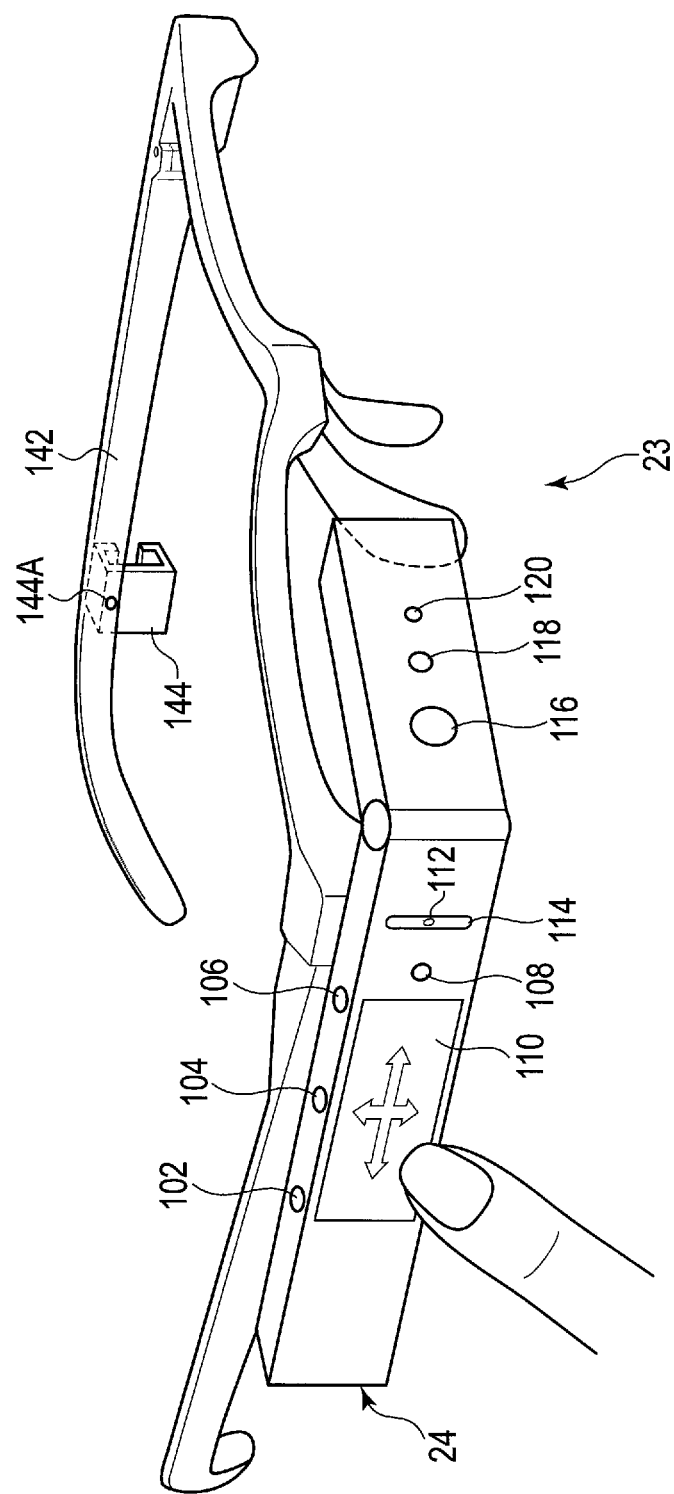
FIG. 3 is a view showing an example of an external appearance of a wearable device 23 to be connected to a mobile PC 16 in FIG. 1.

FIG. 3 shows an example of an external appearance of the wearable device 23 to be connected to the mobile PC 16. The wearable device 23 is provided with an eyeglass frame 142 and a wearable device main body 24. The eyeglass frame 142 may have a shape obtained by removing lenses from general eyeglasses and is worn on the face of the worker. The eyeglass frame 142 may have a structure to which eyeglasses can be attached. When the worker habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right or left temple. In FIG. 3, the mounting bracket 144 on the temple at the right side of the worker is hidden behind the wearable device main body 24, and hence is not shown. As described above, the wearable device main body 24 is provided with a display device 124 (shown in FIG. 4). The display device 124 is configured in such a way as to be viewed by one eye. Therefore, the mounting brackets 144 are provided on both the right and left temples so that the wearable device main body 24 can be attached to the mounting bracket on the dominant eye side. The wearable device main body 24 need not be detachably attached to the eyeglass frame 142 by means of the mounting bracket 144. The wearable devices 23 for the right eye and left eye in which the wearable device main bodies 24 are respectively fixed to the eyeglass frames 142 on the right and left frames may be prepared. Furthermore, the wearable device main body 24 may not be attached to the eyeglass frame 142, but may be attached to the head of the worker by using a helmet or a goggle.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the worker's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display device 124 can be positioned on the worker's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the worker without detaching/reattaching the entire wearable device 23 from/to the face of the worker.

[Wearable Device Main Body 24]

The wearable device main body 24 is constituted of a side part to be along the temple of the eyeglass frame 142, and a front part to be positioned on the line of sight of one eyeball of the worker. The angle which the front part forms with the side part is adjustable.

As shown in FIG. 3, on the outside surface of the front part, a camera 116, a light 118, and a camera LED 120 are provided. The light 118 is an auxiliary lighting fixture emitting light at the time of shooting a dark object. The camera LED 120 is configured to be turned on at the time of shooting a photograph or a video to thereby cause the objective person to be photographed to recognize that he or she is to be photographed.

On the top surface of the side part of the wearable device main body 24 attached to the right side temple, first, second, and third buttons 102, 104, and 106 are provided. When the dominant eye of the worker is the left eye, the wearable device main body 24 is attached to the left side temple. The top and the bottom of the wearable device main body 24 are reversed according to whether the wearable main body 24 is attached to the right side temple or the left side temple. Therefore, the first, second, and third buttons 102, 104, and 106 may be provided on both the top surface and the undersurface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device main body 24 is attached to the right side temple, the buttons 102, 104, and 106 are arranged at positions at which the buttons 102, 104, and 106 can be operated by a forefinger, a middle finger, and a third finger, respectively. The touch pad 110 is configured such that the movement of finger in up and down directions or back and forth directions on the surface on the touch pad 110 as indicated by arrows can be detected. The movement to be detected includes flicking of a finger for grazing the surface quickly in addition to dragging of a finger for moving the finger with the finger kept in contact with the surface. Upon detection of up-and-down or back-and-forth movement of the worker's finger, the touch pad 110 inputs a command. In this description, the command implies an executive instruction to execute specific processing to be issued to the wearable device main body 24. Operation procedures for the first to fourth buttons 102, 104, 106, and 108, and the touch pad 110 are determined in advance by the application program.

For example, when the third button 106 is pressed once, item selection/item execution is carried out, when the third button 106 is pressed for a long time, a list of activated application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the keyboard) of an operation is executed.

Regarding the operation of the touch pad 110, for example, when the touch pad 110 is dragged up and down, the cursor is moved up and down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 3 is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display device.

Figure 4:
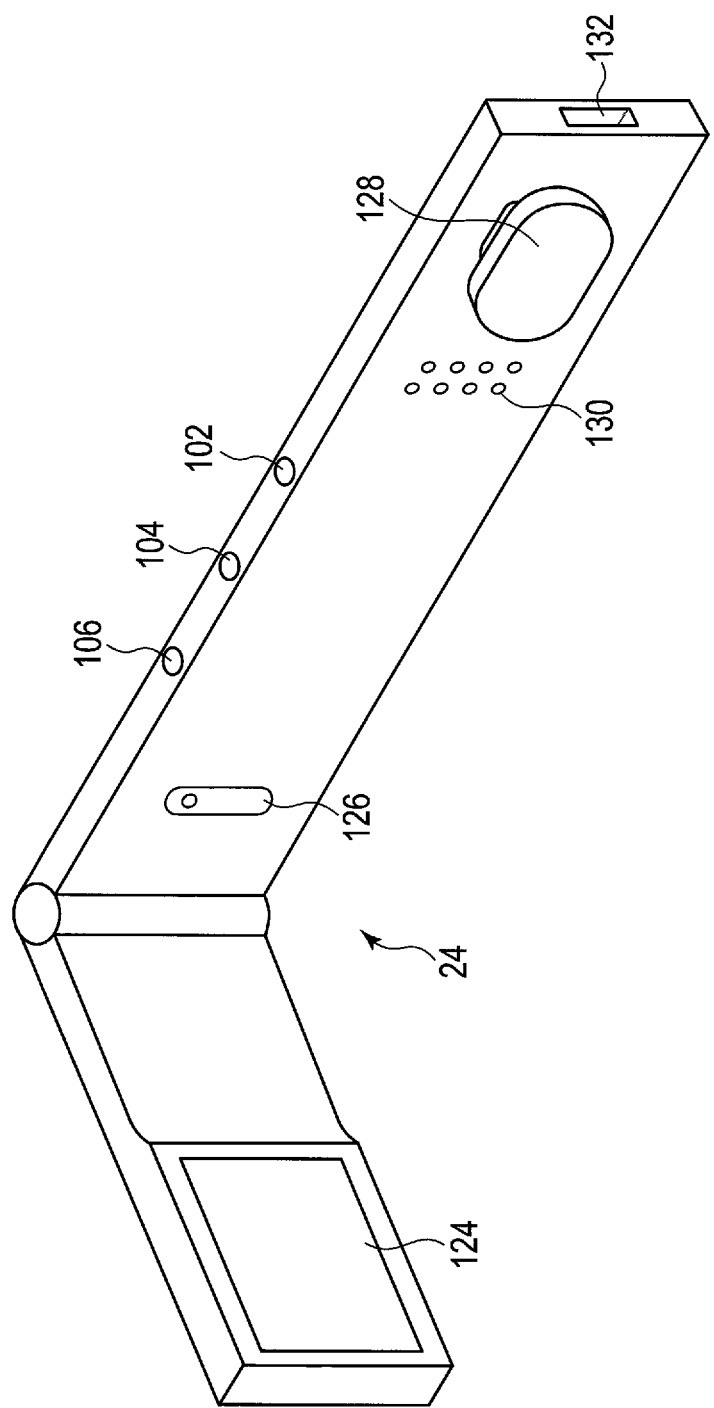
FIG. 4 is a view showing an example of an external appearance of a main body 24 of the wearable device 23.

FIG. 4 shows an example of an external appearance of the back side of the wearable device main body 24. On the inner side of the front part, a display device 124 constituted of an LCD is provided. On the inner side of the side part, a microphone 126, a speaker 130, and an engaging piece 128 are provided. The microphone 126 is provided at a front position of the side part, and the speaker 130 and the engaging piece 128 are provided at a rear position of the side part. Headphones may be used in place of the speaker 130. In this case, the microphone and the headphones may also be provided in an integrated manner as an intercom in the same manner as the operator terminal 12.

Figure 5:
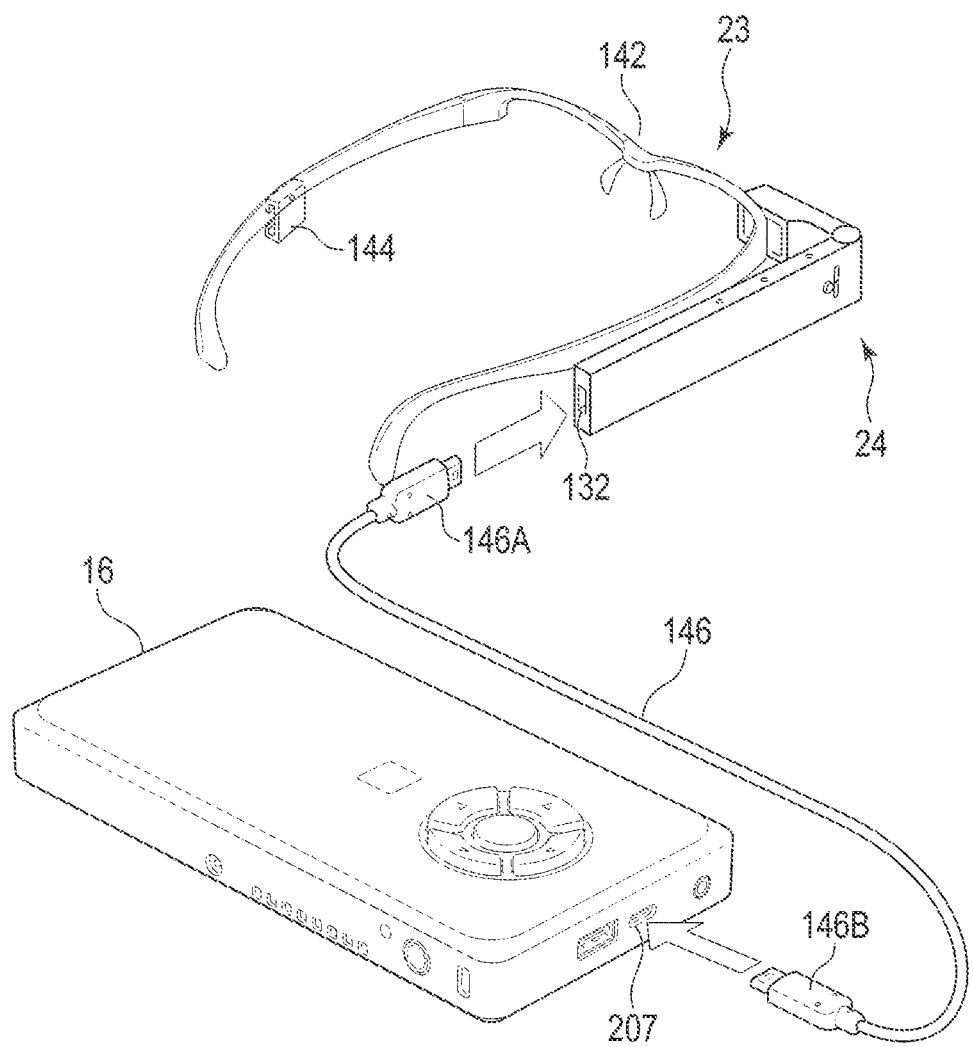
FIG. 5 is a view showing an example of connection between the mobile PC 16 and the wearable device main body 24.

FIG. 5 shows an example of connection between the mobile PC 16 and the wearable device main body 24. At a rear position of the side part, a receptacle 132 into which a plug 146A at one end of a cable 146 conforming to the USB type-C (registered trade mark) standard is to be inserted is provided. A plug 146B at the other end of the USB type-C cable 146 is inserted into a connector 207 conforming to the USB type-C standard provided on an upper end face of the mobile PC 16. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or a DC terminal serving as a drive power supply, and the drive power is supplied from the mobile PC 16 to the wearable device main body 24 through the USB type-C cable 146. However, the wearable device main body 24 may also be provided with a drive power supply.

FIG. 6 is a block diagram showing an exemplary structure of the wearable device main body 24. The USB type-C connector 132 is connected to a mixer 166. A display controller 170 and USB hub 164 are respectively connected to a first terminal and a second terminal of the mixer 166. The display device 124 is connected to the display controller 170. A camera controller 168, an audio codec 172, and a sensor controller 162 are connected to the USB hub 164. The camera 116, the light 118, and the camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 104, 106, and 108, and a GPS sensor 180 are connected to the sensor controller 162. The sensor controller 162 processes detection signals from the motion sensor 176, the illuminance sensor 114, the proximity sensor 178, the touch pad 110, the first to fourth buttons 102, 104, 106 and 108, and the GPS sensor 180, and supplies a command to the mobile PC 16. Although not shown in FIG. 4, the motion sensor 176 and the proximity sensor 178 are arranged inside the wearable device main body 24. The motion sensor 176 detects a motion, a direction, a posture and the like of the wearable device main body 24. The proximity sensor 178 detects attachment of the wearable device 23 on the basis of approach of a face, a finger and the like of the worker thereto.

[Mobile PC 16]

Figure 7:
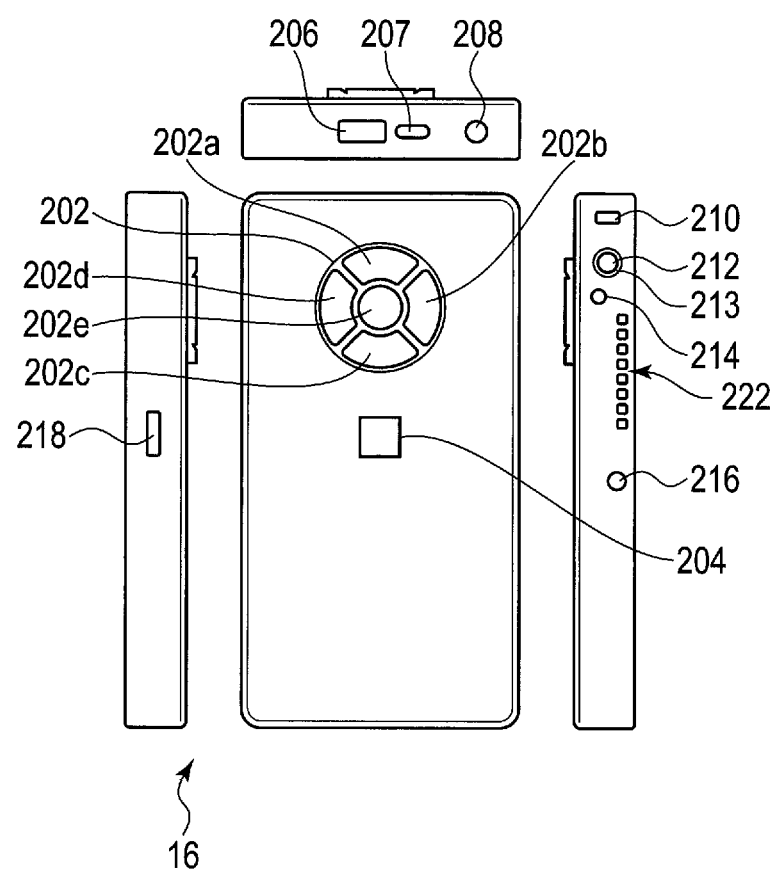
FIG. 7 is a view showing an example of an external appearance of the mobile PC 16.

FIG. 7 shows an example of an external appearance of the mobile PC (mobile edge computing device) 16. The mobile PC 16 is a small-sized PC that can be held by one hand, and has a small size and light weight, i.e., a width thereof is about 10 cm or less, a height thereof is about 18 cm or less, a thickness thereof is about 2 cm, and a weight thereof is about 300 g. Accordingly, the mobile PC 16 can be held in a pocket of the work clothing of the worker, a holster to be attached to a belt, or a shoulder case, and is wearable. Although the mobile PC 16 incorporates therein semiconductor chips such as a CPU, a semiconductor memory and the like, and storage devices such as a Solid State Drive (SSD) and the like, the mobile PC 16 is not provided with a display device and a hardware keyboard for input of characters.

On the front surface of the mobile PC 16, five buttons 202 constituted of an up button 202a, a right button 202b, a down button 202c, a left button 202d, and a decision button 202e (also called a center button or an enter button) are arranged, and a fingerprint sensor 204 is arranged below the five buttons 202. The mobile PC 16 is not provided with a hardware keyboard for input of characters, and a password number (also called a PIN) cannot be input. Therefore, the fingerprint sensor 204 is used for user authentication at the time of login of the mobile PC 16. The five buttons 202 can input a command.

User authentication at the time of login may be carried out by allocating numeric characters to the buttons 202a to 202d of the five buttons 202, and by inputting a password number using the five buttons 202. In this case, the fingerprint sensor 204 can be omitted. Numeric characters are allocated to the four buttons 202a to 202d other than the decision button 202e, and the number of the numeric characters is only four. Thus, there is a possibility of numeric characters input in a random manner being coincident with the password number. However, by making the digit number of the password number large, it is possible to make the probability that the numeric characters input in a random manner will be coincident with the password number low. Authentication by the five buttons 202 may be enabled in also a mobile PC 16 provided with a fingerprint sensor 204. Although one mobile PC 16 may be shared among a plurality of workers, it is not possible to cope with such a case by only the fingerprint authentication.

The operations identical to those of the buttons 102, 104, 106 and 108, and the touch pad 110 of the wearable device main body 24 can also be applied to the five buttons 202. The worker cannot watch the state where the buttons 102, 104, 106 and 108, and the touch pad 110 of the wearable device main body 24 are being operated. Therefore, it may be necessary for a worker to become accustomed to carrying out an intended operation depending on the worker. Further, the buttons 102, 104, 106 and 108 and the touch pad 110 are small in size, and thus they may be difficult to operate. In the embodiment, the five buttons 202 of the mobile PC 16 can also be operated in the same manner as above, and hence the above-mentioned fear can be dispelled. The operation procedures of the five buttons 202 are determined by the application program.

For example, when the decision button 202e is pressed once, item selection/item execution is carried out (corresponding to pressing once of the third button 106 in the wearable device main body 24), when the decision button 202e is pressed for a long time, ending or cancellation of an operation is carried out (corresponding to pressing once of the first button 102 in the wearable device main body 24), when the up button 202a is pressed once, the cursor is moved upward (corresponding to upward drag on the touch pad 110 in the wearable device main body 24), when the up button 202a is pressed for a long time, a list of activated application programs is displayed (corresponding to pressing the third button 106 for a long time in the wearable device main body 24), when the down button 202c is pressed once, the cursor is moved downward (corresponding to downward drag on the touch pad 110 in the wearable device main body 24), when the down button 202c is pressed for a long time, a menu of quick settings is displayed (corresponding to pressing of the second button 104 for a long time in the wearable device main body 24), when the left button 202d is pressed once, the right icon is selected (corresponding to backward drag/flick on the touch pad 110 in the wearable device main body 24), and when the right button 202b is pressed once, the left icon is selected (corresponding to forward drag/flick on the touch pad 110 in the wearable device main body 24).

On the upper side face of the mobile PC 16, a USB 3.0 connector 206, a USB type-C connector 207, and an audio jack 208 are provided.

On one side face (side face on the left side when viewed from the front) of the mobile PC 16, a memory card slot 218 for a memory card is provided. The memory card includes, for example, an SD card, a micro SD card (registered trade mark), and the like.

On the other side face (side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not the battery is being charged, and the remaining battery level. Although the mobile PC 16 can be driven by the battery, the mobile PC 16 can also be driven in the state where the AC adaptor is connected to the DC terminal 216. Although not shown, the back side of the mobile PC 16 is configured such that the battery can be replaced with a new one by a one-touch operation.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and a viewer function. The camera function is a function of shooting a photograph or a video by means of the camera 116 of the wearable device main body 24. The shot photograph and video are stored in a camera folder (not shown) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal 12, images transmitted to the operator terminal 12, and files stored in a user folder (not shown) in the mobile PC 16.

The mobile PC 16 is provided with a system controller 302. The system controller 302 is constituted of a processor (CPU) and a controller/hub (not shown in FIG. 8). A main memory 308, the power LED 213, the DC IN/battery LED 214, and a USB controller 322 are connected to the processor of the system controller 302. A flash memory 326, a memory card controller 328, a storage device 330 constituted of an HDD or an SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 316, and a front-end application program 314 for remote support. The front-end application program 314 includes a screen direction control program.

The audio codec 334 converts a digital audio signal which is an object (to be reproduced) into an analog audio signal, and supplies the converted analog audio signal to the audio jack 208. Further, the audio codec 334 converts the analog audio signal (input from the audio jack 208) into a digital signal.

The memory card controller 328 accesses to a memory card such as an SD card to be inserted into the memory card slot 218, and controls read/write of data from/to the SD card.

The USB controller 322 carries out control of transmission/reception of data to/from the USB type-C cable 146 (shown in FIG. 5) connected to the USB type-C connector 207 or the USB 3.0 cable (not shown) connected to the USB 3.0 connector 206.

Although not shown, a port extension adaptor including ports or connectors according to several interfaces can be connected also to the USB type-C connector 207, and an interface which is not provided in the mobile PC 16, such as the HDMI or the like, can be used.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component. The power circuit 350 includes a voltage regulator module 356. The voltage regulator module 356 is connected to the processor in the system controller 302.

Although the mobile PC 16 is constituted as a body separate from the wearable device main body 24, the mobile PC 16 may be incorporated into the wearable device main body 24, and both of them may also be integrated into one body.

[Screen Direction Control]

As described above with reference to FIG. 3, the wearable device main body 24 is attached to the temple of the eyeglass frame 142 on the dominant eye side. There is a difference (reverse) in vertical direction of the screen between the case where the wearable device main body 24 is attached on the right side and the case where the wearable device main body 24 is attached on the left side. For example, although when the wearable device main body 24 is attached to the temple on the right side of the worker, the screen is displayed upward, i.e., right side up, when the wearable device main body 24 is attached to the temple on the left side of the worker, the screen is displayed downward, i.e., upside down, thereby making the screen hard for the worker to watch.

Accordingly, in the embodiment, the direction of the screen (vertical direction of the displayed content on the screen) is controlled according to whether the wearable device main body 24 is attached on the right side of the eyeglass frame 142 or on the left side thereof. As in the case of a conventional mobile device such as a smartphone or the like, it is conceivable that the posture of the wearable device main body 24, i.e., whether the wearable device main body 24 is attached on the right side of the eyeglass frame 142 or on the left side thereof is detected by means of the motion sensor, and the direction of the screen is controlled according to the detection result. However, by this method, the screen may be displayed in a direction which the worker does not intend depending on the work content of the worker. For example, in the automobile maintenance work, the worker may peep into the underside of a car with his or her head lowered, or the work is carried out by the worker crawling under a car while lying on his or her back. At this time, when the head of the worker is directed from the horizontal direction toward the vertically downward direction even slightly, the motion sensor may detect a change in the posture, and the direction of the screen may be reversed. Further, when the wearable device main body 24 is flipped up, the motion sensor may detect a change in the posture, and the direction of the screen may be reversed.

The wearable device main body 24 of the embodiment is provided with the motion sensor 176 (for example, an acceleration sensor, a geomagnetism sensor, a gravitation sensor, a gyroscopic sensor, etc.) and proximity sensor 178, and transmits the detection results of these sensors to the mobile PC 16. The mobile PC 16 controls the direction of the screen according to the detection results of these sensors such that the aforementioned situation is not caused.

Figure 9:
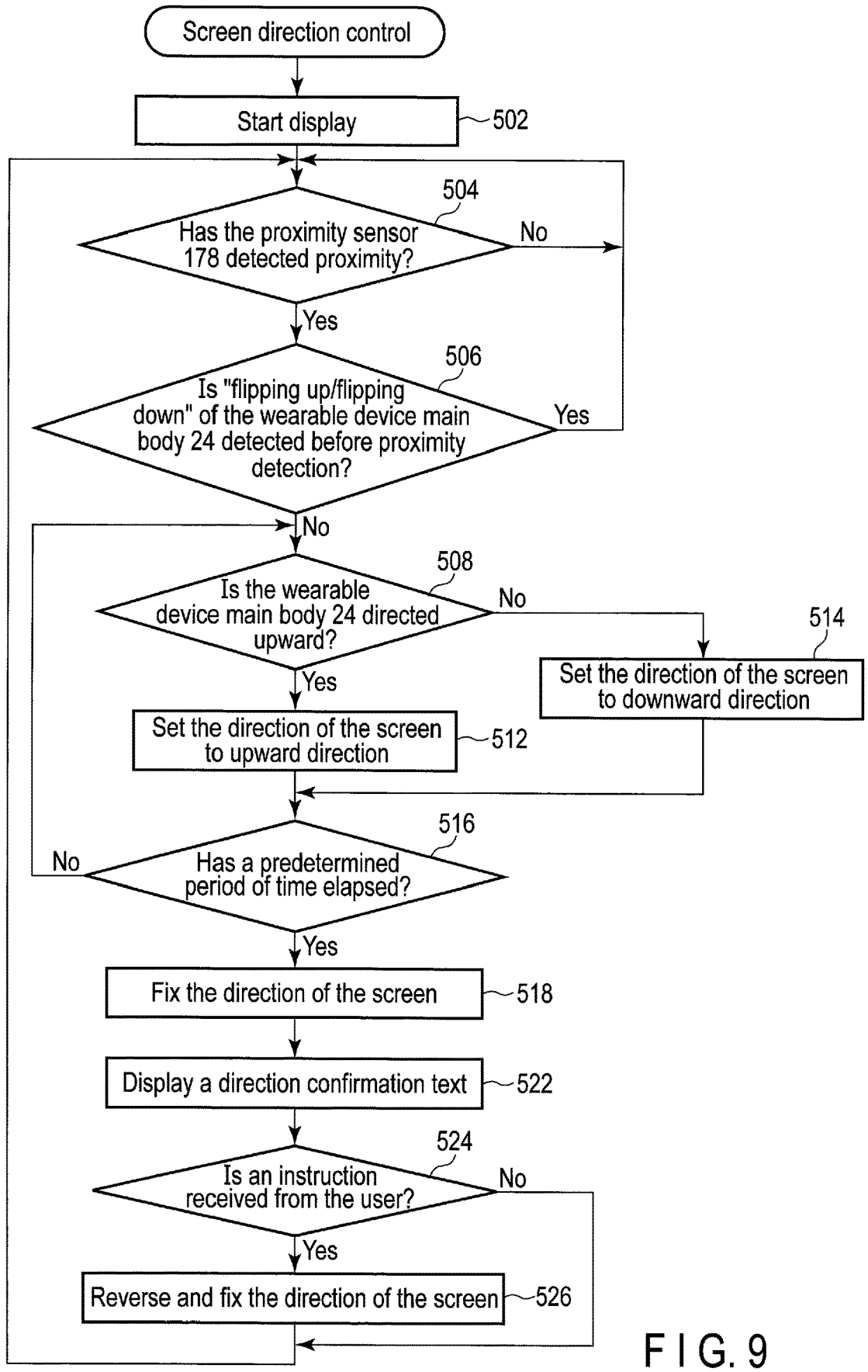
FIG. 9 is a flowchart showing an example of automatic adjustment control of the direction of the screen carried out by the mobile PC 16.

FIG. 9 is a flowchart showing an example of screen direction control processing. As described above with reference to FIG. 5, the wearable device main body 24 is not provided with a drive power supply. When the mobile PC 16 and the wearable device main body 24 are connected to each other through the USB type-C cable 146, power is supplied from the mobile PC 16 to the wearable device main body 24 and the power supply of the wearable device main body 24 is turned on. In step 502, the mobile PC 16 supplies an image signal to the wearable device main body 24, and makes the display device 124 display an image. It is assumed that at this time, the direction of the screen is controlled such that the upper side of the image is coincident with the upper side of the display device 124 in the state of FIG. 3. Accordingly, although when the wearable device main body 24 is attached to the temple on the right side of the worker, the screen is displayed upward, when the wearable device main body 24 is attached to the temple on the left side of the worker, the screen is displayed downward. The direction of the screen in the initial state may also be controlled such that in step 502, the upper side of an image becomes the lower side of the display device 124 in the state of FIG. 3.

In step 504, the mobile PC 16 determines whether or not the detection result of the proximity sensor 178 has changed from non-proximity to proximity. The proximity sensor 178 detects approach of a human body, and when the detection result of the proximity sensor 178 has changed from non-proximity to proximity, the mobile PC 16 determines that the worker has wear the wearable device 23. When the proximity sensor 178 does not detect proximity, the determination of step 504 is repeated.

In the example of the automobile maintenance work or the like described above, when the field of view of the worker is obstructed by the wearable device main body 24, the worker temporarily may flip up the wearable device main body 24. Thereby, the display device 124 of the wearable device main body 24 is positioned outside the field of view of the worker. When the wearable device main body 24 is flipped up, the detection result of the proximity sensor 178 becomes non-proximity, and it is determined that the wearable device 23 is removed. Thereafter, when the wearable device main body 24 is flipped down from the flipped-up state to the original state, i.e., when the display device 124 of the wearable device main body 24 is positioned inside the field of view of the worker, the detection result of the proximity sensor 178 becomes proximity. Accordingly, the mobile PC 16 erroneously determines that the worker has put on the wearable device 23.

In order to distinguish between detection of proximity based on "flipping up/flipping down" (flipping up thereafter flipping down) of the wearable device main body 24 and detection of proximity based on putting on of the wearable device 23, when proximity is detected in step 504, the mobile PC 16 determines in step 506 according to the output of the motion sensor 176 whether or not a "flipping up/flipping down" operation of the wearable device main body 24 has been detected before the detection of proximity by the proximity sensor 178. For this determination, the mobile PC 16 keeps the output of the motion sensor 176 in the main memory 308 for a predetermined period of time, e.g., about several dozen minutes. The "flipping up/flipping down" operation is an up-and-down motion of the wearable device main body 24 around the mounting bracket 144 of the temple of the eyeglass frame 142.

When the "flipping up/flipping down" operation has been detected before the detection of proximity by the proximity sensor 178, the determination of step 504 is repeated.

When the "flipping up/flipping down" operation has not been detected by the motion sensor 176 before the detection of proximity by the proximity sensor 178, the mobile PC 16 determines in step 508 according to the output of the motion sensor 176 whether or not the mounting direction of the wearable device main body 24 is the upward direction, i.e., whether or not the wearable device main body 24 is attached to the temple on the right side of the worker. When it is detected that the mounting direction of the wearable device main body 24 is the upward direction, the mobile PC 16 sets the direction of the screen to the upward direction in step 512. When the direction of the screen is the upward direction, the upper side of the image corresponds to the upper side of the display device 124. When it is detected that the mounting direction of the wearable device main body 24 is not the upward direction, i.e., that the wearable device main body 24 is attached to the temple on the left side of the worker, the mobile PC 16 sets the direction of the screen to the downward direction in step 514. When the direction of the screen is the downward direction, the upper side of the image corresponds to the lower side of the display device 124. Although the mobile PC 16 may control the direction of the screen, in the embodiment, the display controller 170 of the wearable device main body 24 controls the direction of the screen.

In steps 512 and 514, the mobile PC 16 transmits a screen direction control signal to the display controller 170 of the wearable device main body 24. Although not shown in FIG. 6, the display controller 170 is provided with a frame memory, and an image signal to be supplied to the display device 124 is temporarily written to the frame memory. When the direction of the screen is to be reversed, in reading of the image signal from the frame memory, the pixels are read in the order reverse to the order in which the pixels are written. When the direction of the screen is controlled on the mobile PC 16 side, it is sufficient if the frame memory is provided in the main memory 308, and processing identical to that described above is carried out.

After step 512 or 514, the mobile PC 16 determines in step 516 whether or not a predetermined period of time (for example, a period of several seconds) has elapsed from a point in time at which the proximity sensor 178 has detected proximity (detection of attachment of the mobile device 23). Namely, the predetermined period of time begins at a time when the proximity sensor 178 has detected that the user has put on the mobile device 23. Until the predetermined period of time elapses, the flow returns to step 508, determination of the direction of mounting of the wearable device main body 24 on the temple of the eyeglass frame 142 by the motion sensor 176, and setting of the direction of the screen according to the mounting direction, are repeated. For this reason, until the predetermined period of time elapses from detection of attachment of the mobile device 23, reversal of the direction of the screen may be repeated in some cases. This is carried out for the purpose of enhancing the detection accuracy of the motion sensor 176, and also for the purpose of notifying the worker that the wearable device 23 is in the period during which the direction of the screen is automatically adjusted. By recognizing the period during which the direction of the screen is automatically adjusted, the worker can keep his or her head still in order that the motion sensor 176 can avoid false detection. Thereby, the detection accuracy of the motion sensor 176 can further be enhanced. If the predetermined period of time is set to a very short time, the determination step 516 can be omitted.

When the predetermined period of time has elapsed from the point in time of attachment detection, the mobile PC 16 fixes the direction of the screen in step 518. That is, after this, the direction of the screen does not change irrespective of the detection result of the motion sensor 176, i.e., irrespective of the posture of the worker.

By the operation described above, for a predetermined period of time from the detection of the attachment of the wearable device 23, the mobile PC 16 controls the direction of the screen according to the detection result of the motion sensor 176. Then, when the predetermined period of time has elapsed, the mobile PC 16 fixes the direction of the screen and, thereafter, does not execute control of the direction of the screen based on the detection result of the motion sensor 176. Thereby, when the wearable device 23 is attached to the worker, the direction of mounting of the wearable device main body 24 on the temple of the eyeglass frame 142 is detected by the motion sensor 176, and the direction of the screen of the wearable device main body 24 is automatically adjusted according to the detection result. The automatic adjustment is continued for a predetermined period of time, and after the predetermined period of time has elapsed, the direction of the screen is fixed. Accordingly, even when the worker assumes any posture (for example, a posture of peeping into the underside of a car with the head of the worker lowered or a posture of crawling under a car while lying on the back) while he or she is working, the direction of the screen is never reversed, and the screen is displayed with an direction intended by the worker at all times.

Although FIG. 9 includes steps 522, 524, and 526 after step 518, the automatic adjustment processing of the screen direction has been completed at the end of step 518, as described above. Therefore, processing of steps 522, 524, and 526 may be omitted.

Figure 10:
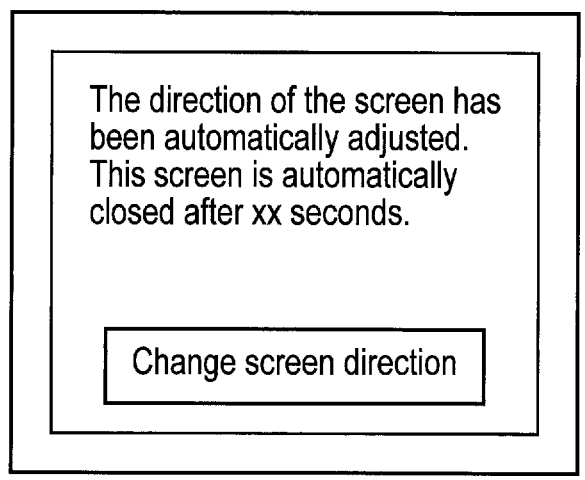
FIG. 10 is a view showing an example a confirmation text to be displayed after automatic adjustment of the direction of the screen.

In step 522, the mobile PC 16 makes the display device 124 of the wearable device main body 24 display a "screen direction confirmation text" in order to make the worker determine whether or not the result of the automatic adjustment of the display direction is appropriate. An example of the "screen direction confirmation text" is shown in FIG. 10. For example, the text includes "The direction of the screen has been automatically adjusted. This screen is automatically closed after xx seconds". Under the text, a "change screen direction" button is displayed. When the "screen direction confirmation text" is displayed, the cursor is positioned at the "change screen direction" button, and when the decision button 202e of the mobile PC 16 is pressed once or when the third button 106 of the wearable device main body 24 is pressed once, the "change screen direction" button is selected (an instruction is received from the user) in step 524, the instruction to reverse the screen is supplied from the mobile PC 16 to the display controller 170 in step 526, and reversal processing of the screen is carried out. Namely, the direction of the screen is reversed and fixed in step 526.

As described above, it is even possible to, after the automatic adjustment, further reverse the screen by a manual operation of the worker, and hence even when it is difficult to carry out automatic adjustment of the direction of the screen, the direction of the screen can appropriately be set.

The processing of this embodiment can be realized by means of a computer program, and hence it is possible to easily realize an advantage identical to this embodiment by only installing this computer program into a computer through a computer-readable storage medium storing therein this computer program, and executing this computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the wearable device main body 24 of the embodiment is not provided with a power supply. Therefore, the wearable device main body 24 is connected to the mobile PC 16, power is supplied thereto from the mobile PC 16, and the mobile PC 16 performs processing such as the display direction control or the like, and processing of a signal of an image shot by the wearable device main body 24 and an image signal to be displayed on the wearable device main body 24. However, the function of the mobile PC 16 and the power supply may be included in the wearable device main body 24, whereby the mobile PC 16 may be omitted, and processing may be performed by the wearable device main body 24. The system configuration in this case can be formed by omitting the mobile PC 16 from the configuration of each of FIG. 1 and FIG. 5, and by combining the block circuit diagram of the wearable device main body 24 shown in FIG. 6 with the circuit configuration of the mobile PC 16 shown in FIG. 8.

What is claimed is:

1. An electronic device connectable to a wearable device comprising a display device, an attachment sensor, and a posture sensor,
   the electronic device comprising:
   a screen direction controller configured to control a direction of a screen of the display device according to a posture of the wearable device detected by the posture sensor for a period of time beginning at a time when the attachment sensor has detected that a user has put on the wearable device.

2. The electronic device according to claim 1, wherein the screen direction controller is configured to fix the direction of the screen of the display device after the period of time has elapsed.

3. The electronic device according to claim 2, wherein the screen direction controller is further configured to make the display device to display a text information concerning the direction of the screen after fixing the direction of the screen of the display device.

4. The electronic device according to claim 3, wherein the screen direction controller is further configured to reverse the direction of the screen responsive to an instruction received from the user after the display device has displayed the text information concerning the direction of the screen.

5. The electronic device according to claim 1, wherein the wearable device comprises
   an eyeglass frame, and
   a device main body comprising the display device, the attachment sensor, and the posture sensor,
   wherein the device main body is configured to be attachable to the eyeglass frame such that the device main body is switchable between a first position at which the display device is positioned inside a field of view of the user and a second position at which the display device is positioned outside the field of view of the user.

6. The electronic device according to claim 5, wherein the screen direction controller is further configured to maintain the direction of the screen of the display device when the attachment sensor has detected that the user has put on the wearable device after the posture sensor has detected that a position of the device main body has changed from the second position to the first position.

7. The electronic device according to claim 1, wherein the posture sensor comprises at least one of a gravitation sensor, a geomagnetism sensor, an acceleration sensor, or a gyroscopic sensor.

8. A wearable device comprising:
   a display device;
   an attachment sensor;
   a posture sensor; and
   a screen direction controller configured to control a direction of a screen of the display device according to a posture of the wearable device detected by the posture sensor for a period of time beginning at a time when the attachment sensor has detected that a user has put on the wearable device.

9. The wearable device according to claim 8, wherein the screen direction controller is configured to fix the direction of the screen of the display device after the period of time has elapsed.

10. The wearable device according to claim 9, wherein the screen direction controller is further configured to make the display device to display a text information concerning the direction of the screen after fixing the direction of the screen of the display device.

11. The wearable device according to claim 10, wherein the screen direction controller is further configured to reverse the direction of the screen responsive to an instruction received from the user after the display device has displayed the text information concerning the direction of the screen.

12. The wearable device according to claim 8, further comprising:
    an eyeglass frame; and
    a device main body comprising the display device, the attachment sensor, and the posture sensor,
    wherein the device main body is configured to be attachable to the eyeglass frame such that the device main body is switchable between a first position at which the display device is positioned inside a field of view of the user and a second position at which the display device is positioned outside the field of view of the user.

13. The wearable device according to claim 12, wherein the screen direction controller is further configured to maintain the direction of the screen of the display device when the attachment sensor has detected that the user has put on the wearable device after the posture sensor has detected that a position of the device main body has changed from the second position to the first position.

14. The wearable device according to claim 8, wherein the posture sensor comprises at least one of a gravitation sensor, a geomagnetism sensor, an acceleration sensor, or a gyroscopic sensor.

15. A display control method of an electronic device connectable to a wearable device comprising a display device, an attachment sensor, and a posture sensor,
    the display control method comprising:
    detecting, using the attachment sensor, that a user has put on the wearable device; and
    controlling a direction of a screen of the display device according to a posture of the wearable device detected by the posture sensor for a period of time beginning at a time when the attachment sensor has detected that the user has put on the wearable device.

16. The display control method according to claim 15, further comprising:
    fixing the direction of the screen of the display device after the period of time has elapsed.

17. The display control method according to claim 16, further comprising:
   making the display device to display a text information concerning the direction of the screen after fixing the direction of the screen of the display device.

18. The display control method according to claim 17, further comprising:
   reversing the direction of the screen responsive to an instruction received from the user after the display device has displayed the text information concerning the direction of the screen.

19. The display control method according to claim 15, wherein
   the wearable device comprises
   an eyeglass frame, and
   a device main body comprising the display device, the attachment sensor, and the posture sensor,
   wherein the device main body is configured to be attachable to the eyeglass frame such that the device main body is switchable between a first position at which the display device is positioned inside a field of view of the user and a second position at which the display device is positioned outside the field of view of the user.

20. The display control method according to claim 19, further comprising:
   maintaining the direction of the screen of the display device when the attachment sensor has detected that the user has put on the wearable device after the posture sensor has detected that a position of the device main body has changed from the second position to the first position.

* * * * *